United States Patent
Tanaka (10) Patent No.: US 8,655,182 B2
(45) Date of Patent: Feb. 18, 2014

(54) OPTICAL TRANSCEIVER IMPLEMENTED WITH I2C BUSSES ARBITRATED BY SELECTOR

(75) Inventor: Yasuhiro Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 194 days.

(21) Appl. No.: 13/399,012

(22) Filed: Feb. 17, 2012

(65) Prior Publication Data

US 2012/0213526 A1 Aug. 23, 2012

(30) Foreign Application Priority Data

Feb. 21, 2011 (JP) ................................. 2011-034922

(51) Int. Cl.
*H04B 10/00* (2013.01)

(52) U.S. Cl.
USPC ............................ 398/138; 398/139; 398/135

(58) Field of Classification Search
USPC ................................................. 398/135–139
See application file for complete search history.

(56) References Cited

U.S. PATENT DOCUMENTS

| | | | |
|---|---|---|---|
| 6,826,658 B1 * | 11/2004 | Gaither et al. ................. | 711/150 |
| 7,016,993 B2 * | 3/2006 | Lee ............................... | 710/100 |
| 7,200,337 B2 * | 4/2007 | Hosking et al. ............... | 398/136 |
| 7,260,662 B2 * | 8/2007 | Moriwaki et al. ............ | 710/107 |
| 7,346,764 B2 * | 3/2008 | Moriwaki et al. ............. | 713/1 |
| 7,359,643 B2 * | 4/2008 | Aronson et al. .............. | 398/136 |
| 7,487,434 B2 * | 2/2009 | Moriwaki et al. ............ | 714/799 |
| 7,529,488 B2 * | 5/2009 | Burdick et al. ............... | 398/137 |
| 7,624,203 B2 * | 11/2009 | Blinick et al. .................. | 710/16 |
| RE44,270 E * | 6/2013 | Hirani et al. ...................... | 710/9 |
| 8,515,284 B2 * | 8/2013 | Aronson et al. .............. | 398/135 |
| 2004/0081424 A1 * | 4/2004 | Moriwaki et al. ............ | 385/147 |
| 2006/0110157 A1 * | 5/2006 | Tritschler et al. .............. | 398/22 |
| 2006/0277346 A1 * | 12/2006 | Doak et al. .................... | 710/305 |
| 2008/0131139 A1 * | 6/2008 | Ishibashi ....................... | 398/155 |
| 2009/0327239 A1 * | 12/2009 | Cho et al. ........................ | 707/3 |
| 2011/0038641 A1 * | 2/2011 | Tanaka et al. ................. | 398/197 |
| 2012/0008962 A1 * | 1/2012 | Tanaka .......................... | 398/135 |
| 2012/0134680 A1 * | 5/2012 | Ekkizogloy et al. .......... | 398/135 |
| 2012/0213526 A1 * | 8/2012 | Tanaka .......................... | 398/135 |

FOREIGN PATENT DOCUMENTS

JP 2004-153403 5/2004

* cited by examiner

*Primary Examiner* — Agustin Bello
(74) *Attorney, Agent, or Firm* — Global IP Counselors, LLP (57) ABSTRACT

An optical transceiver with a bus selector for selecting one of I2C inner busses is disclosed. One of inner I2C buses connects the controller with a nonvolatile memory, while another I2C bus connects the controller with a volatile memory with a priority to the non-volatile memory. When the volatile memory is selected during the controller communicates with the non-volatile memory, the controller sets a command to the bus selector to select the second I2C bus and hold the first I2C bus.

14 Claims, 5 Drawing Sheets

OPTICAL TRANSCEIVER IMPLEMENTED WITH I2C BUSSES ARBITRATED BY SELECTOR

BACKGROUND OF THE INVENTION

1. Field of the Invention

The present invention relates to an optical transceiver, in particular, the invention relates to control inner status of the optical transceiver.

2. Related Background Art

One type of optical transceivers, which conforms to the standard IEEE 802.3ae, implements with registers of a nonvolatile register (NVR) and digital diagnostic monitors (DDM), such as that disclosed in a Japanese Patent Application published as JP-2004-153403A. The optical transceiver may further implement with a controller including a Management Data Input/Output (MDIO) register to monitor inner status of the optical transceiver and temporarily store thus monitored status in the MDIO register periodically.

When the DDM and the NVR are coupled with the controller via a serial bus, arbitration algorithm between two devices and the controller is necessary. Moreover, because the collection of the inner status of the optical transceiver within the DDM is requested in real time, compared with the access to the NVR, the arbitration of two devices is necessary to include the priority of the DDM. An arrangement of the dual controller each operating with the DDM and the NVR independently is unfavorable in meanings of size, complexity and cost of the circuit.

SUMMARY OF THE INVENTION

An aspect of the present invention relates an optical transceiver electrically controllable by a host system. The optical transceiver comprises a controller, first and second devices each controlled by the controller, and a bus selector. The first and second devices are connected with the controller by respective I2C bus via the bus selector. The bus selector may select one of I2C busses by a command sent from the controller independent of the I2C busses. Because the optical transceiver of embodiments provides I2C busses independent of other devices, or at least, the device with the higher priority provides an independent I2C bus preferentially assigned thereto, the device with the higher priority is unnecessary to be arbitrated until the I2C bus becomes available. The bus selector, responding to a command sent from the controller independent of the I2C bus, may select the I2C bus connected to the device with the higher priority. Moreover, the optical transceiver of the embodiments may hold the I2C bus connected to the rest device in a state immediate before the selection; and may resume the transmission on the held I2C bus for the reset device from the state. Thus, the selection of the device with the higher priority may be carried out by the interrupted mode.

Because the device with the higher priority is connected to the independent I2C bus, while the other devices is connected via the other I2C bus; the device with the higher priority may be assigned in a slave address thereof same as that for the other devices. The bus selector may distinguish two devises with the same address. Moreover, the I2C bus connected to the higher priority may couple with additional devices, that is, a plurality of devices may have an I2C bus common to each other, one of which has a higher priority. Even in such an arrangement, the device with the higher priority may be selected, even when the other devices grouped by the other I2C bus communicate with the controller. Thus, the optical transceiver according to the embodiments may shorten the access to the device with the higher priority without waiting the I2C bus becomes

BRIEF DESCRIPTION OF DRAWINGS

The foregoing and other purposes, aspects and advantages will be better understood from the following detailed description of a preferred embodiment of the invention with reference to the drawings, in which.

DESCRIPTION OF EMBODIMENTS

Next, some preferred embodiments according to the present invention will be described. In the description of the embodiment, the same numerals or the symbols will refer to the same elements without overlapping explanations.

Figure 1:
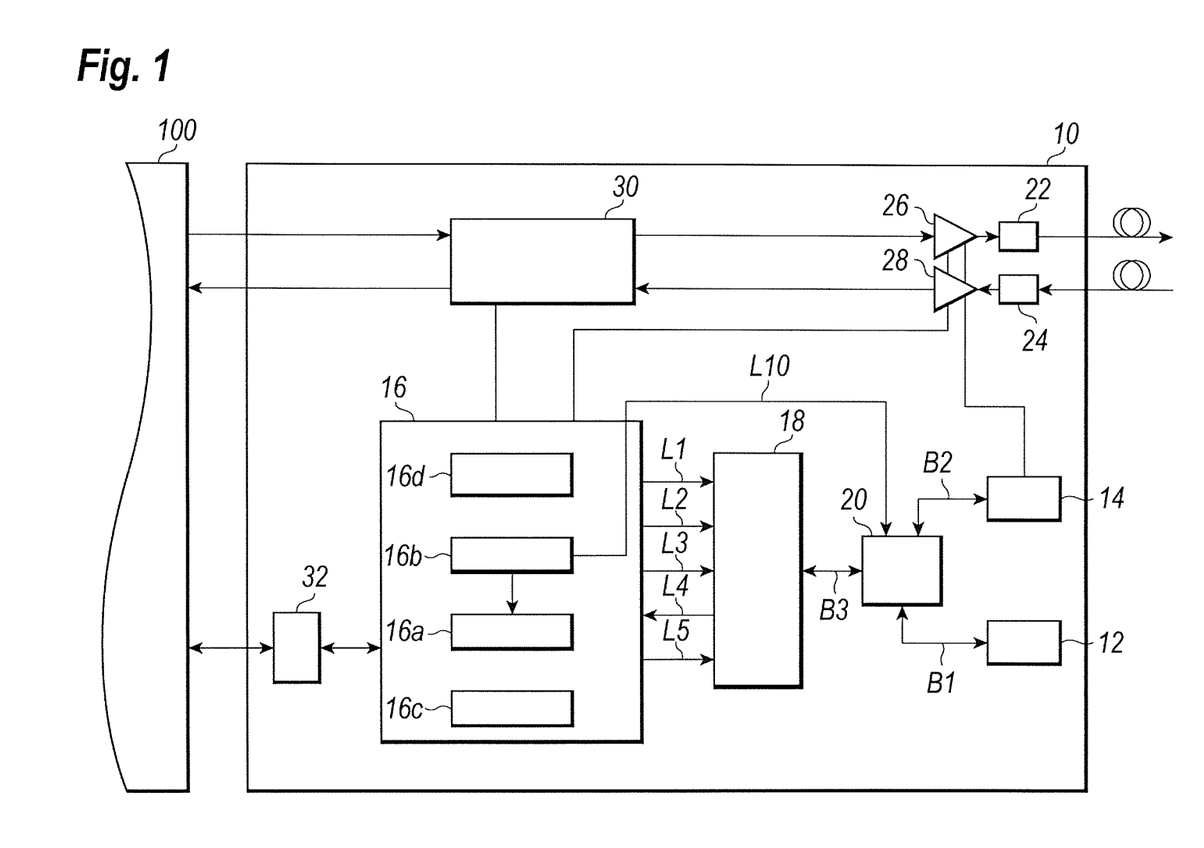
FIG. 1 shows a functional block diagram of an optical transceiver according to an embodiment of the present invention.

FIG. 1 shows a functional block diagram of an optical transceiver according to an embodiment of the invention. The optical transceiver 10 shown in FIG. 1 may mutually convert between an optical signal and an electrical signal, and communicate electrically with the host system 100. As shown in FIG. 1, the optical transceiver 10 may include a nonvolatile memory (NVR) 12, a digital diagnostic monitor (DDM) 14, a controller 16, an I2C interface 18, a bus selector 20, a semiconductor laser diode (LD) 22, a photodiode (PD) 24, a driver 26, a trans-impedance amplifier (TIA) 24, a signal processing unit 30, and an MDIO interface 32.

The driver 26 may driver the LD 22; that is, the LD 22, provided with a driving current from the driver 26, may emit signal light to an optical fiber. On the other hand, the PD 24 is electrically coupled with the TIA 28. The PD 24 may generate a photocurrent by receiving signal light from another optical fiber; and the TIA 28 may convert the photocurrent into a voltage signal. The driver 26 and the TIA 28 are electrically coupled with the signal processing unit 30.

The signal processing unit 30 may generate, by receiving a transmitter signal from the host system 100, a modulating component of the driving current provided to the LD 22 through the driver 26. Also, the processing unit 30 may extract, by receiving the voltage signal from the TIA 28, a clock component and a data component each involved in the voltage signal and output thus extracted clock and data to the host system 100. The extraction of the clock and the data may be carried out by, for instance, a clock-data-recovery (CDR) involved in the processing unit 30.

As shown in FIG. 1, the NVR 12, which is connected with the bus selector 20 via the I2C bus B1, while, the DDM 14 is also connected with the bus selector 20 but via the other I2C bus B2. The bus selector 20 is connected with the I2C interface (I/F) 18 via the third I2C bus B3. The I2C interface 18 is coupled with the controller 16 via a control bus including 5 command lines, L1 to L5. The controller 16, which is coupled with the MDIO interface (MDIO I/F) 32 via an MDIO bus, and this MDIO I/F 32 may communicate with the host system 100 via the external MDIO bus.

The NVR 12 may store semi-permanent data, which are sent from the host system 100, including, for instance, a serial number of the optical transceiver 10, a name of the manufacturer, date of production and so on. The DDM 14 may diagnose inner conditions of the optical transceiver 10. Conditions stored therein are, for instance, the driving current produced by the driver 26, the photocurrent generated by the PD 24, an inner temperature of the optical transceiver 10, and so on. The DDM 14 may include analog-to-digital converters (A/D-C) to convert those analog data described above into a digital code, a plurality of registers to store the converted digital codes, an interface to communicate with the I2C bus B2, and so on. The interface in the DDM 14 may be formed by, for instance, a field programmable gate array (FPGA).

The controller 16 includes the NVR controller 16a, the DDM controller 16b, an MDIO register 16c, and a master control unit 16d. The controller 16 may be a type of a microprocessor; or each of units, 16a to 16d, are independently constituted by a small sized microprocessor controlled by the master control unit 16d. The controller 16 may manage the communication between the optical transceiver 10 and the host system 100 via the MDIO interface 32, and control inner devices of the optical transceiver 10. For instance, a part of the master control unit 16d may control the power supply for the signal lines including the processing unit 30, the driver 26, and the TIA 28; the bias component contained in the driving current; and the bias voltage of the PD 24.

The NVR controller 16a may control the transmission of the data to/from the NVR 12. That is, the NVR controller 16a controls the protocol to write data sent from the host system 100 in the NVR 12, and to read data from the NVR 12 to send to the host system 100.

Further specifically, the NVR controller 16a manages to write data in the NVR 14 and to read data from the NVR 14 following the command or the data stored in the MDIO register 16c by the host system 100. For instance, following information stored in the specific areas in the MDIO register 16c, where the information may be the address and the command to read, the MDIO controller 16a may read a data stored in the address of the NVR 14 and hold the read data in the specific address on the MDIO register 16c. The data thus held in the MDIO register 16c is transmitted to the host system 100 via the MDIO interface 32. Similarly, the NVR controller 16a may write a data, following the information set in the specific areas of the MDIO register 16c by the host system, where the information may be the address and the data, in the address of the NVR 12.

The NVR controller 16a may set a command on one of the command lines L1 to request WRITE operation to the NVR 12 at the beginning the operation. The I2C I/F 18 may transmit this command on the I2C bus B3. The I2C I/F 18 may convert commands and data provided from the controller 16 to signals obeying the I2C bus standard, and set those signals on the I2C busses. Also, the I2C I/F 18 may convert signals coming from the NVR 12 and the DDM 14, which obeys the I2C standards, to those having formats specific to the I2C I/F 18 and outputs those converted signals to the controller 16. The I2C I/F 18 may be also constituted by, for instance, programmable gate arrays.

The NVR controller 16a may, when it asserts the command of WRITE operation to the NVR 12, set the data to be written in the NVR 12 on the line L2. Responding to the command on the line L1 and the data on the line L2, the I2C I/F 18 outputs on the I2C bus B3 the operation code and the data serially. On the other hand, when the READ operation from the NVR 12 is asserted, the NVR controller 16a may set a command on the line L1 to request READ operation. Responding to the command on the line L1, the I2C I/F 18 outputs the code of READ operation on the I2C bus B3. The data read from the NVR 12 may be received by the NVR controller 16a via the I2C I/F 18 and the line L4 to save them in the MDIO register 16c temporarily. The NVR controller 16a may set a command on the line L5 to terminate the transmission at the completion of the transmission with the NVR 12. The I2C I/F 18, responding to the command on the line L5, may output a frame on the I2C bus B3 to terminate the transmission.

The DDM controller 16b may periodically collect data reflecting inner status of the optical transceiver 10 by the digital format, and revise the MDIO register 16c by newly collected data. The DDM controller 16b may communicate with the DDM 14 also via the I2C I/F 18 as those between the NVR controller 16a and the NVR 12 described above.

Specifically, the DDM controller 16b first sets the command to request the operation on the command line L1. Subsequently, the DDM controller 16b, when READ operation is selected, sets the command of READ operation on the line L3 and receives data from the DDM 14 via the I2C I/F 18 and the line L4. The DDM controller 16b writes the received data in the MDIO register 16c, and finally negates the command on the line L5 to complete the transmission from the DDM 14.

The embodiment shown in FIG. 1, the DDM controller 16b may operate as the second and third controllers. That is, the DDM controller 16b at the beginning of the operation first instructs the NVR controller 12a to interrupt the operation thereof; then sets a command on the command line L10 to the bus selector 20 to change the I2C bus from that B1 connected to the NVR 12 to that B2 connected to the DDM 14. The NVR controller 16a, responding the instruction from the DDM controller 16b, to cancel the operation for the NVR 12 when it is under executed.

The bus selector 20 may select one of the busses, B1 and B2. When the NVR controller 16a communicates with the NVR 12, the secondary I2C bus B1 is connected with the primary I2C bus B3, while, the other I2C bus B2 is connected with the third I2C bus B3 when the DMM controller communicates with the DMM 14. Because the bus selector 20 has no intelligent functions, the circuit size thereof may be limited compared with the controller 16 and the I2C I/F 18. In particular, the bus selector 20, when it receives the command from the DDM controller 16b to select the second I2C bus B2 during the operation with the NVR 12 by the first I2C bus B1, the second I2C bus B2 may be preferentially select the second I2C bus B2, which results in a condition that the first I2C bus is held in a state immediate before the change because the serial clock coming from the I2C I/F 18 is ceased. Thus, the access to the NVR 12 may be sustained and begin the transmission with the DDM 14.

The DDM controller 16b, at the completion of the transmission to the DDM 14, may negate the instruction to the NVR controller 16a and reset the command on the command line L10 to switch the secondary I2C bus from the first one B1 to the second one B2. Thus, the NVR controller 16a may resume the transmission with the NVR 12.

Figure 2:
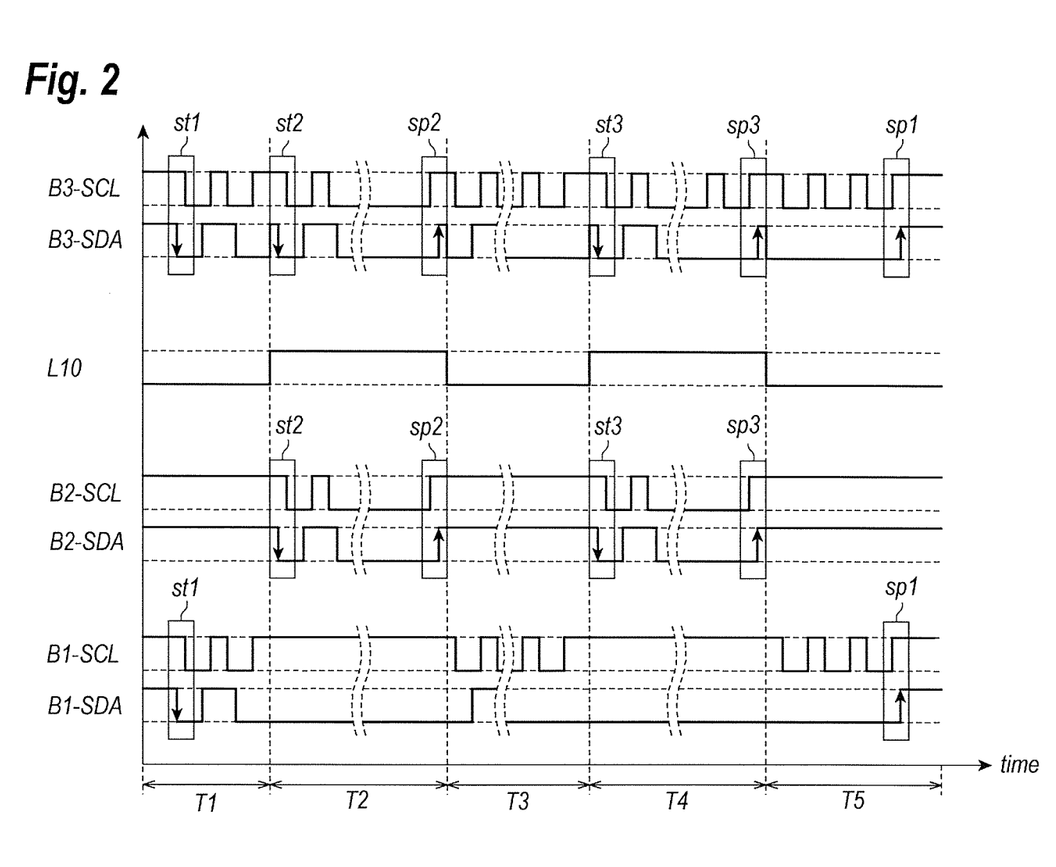
FIG. 2 shows time charts of respective I2C busses implemented within the optical transceiver shown in FIG. 1.

Next, the protocol to select one of the secondary busses, B1 and B2, by the command on the command line L10 will be further described. FIG. 2 shows timing charts of signals on the I2C busses described above. The I2C bus comprises two lines, one of which is for the serial clock (SCL) and the other is for the serial data (SDA). Accordingly, the bus B1 includes two lines, B1-SCL and B1-SDA. Similarly, the second I2C bus B2 also includes B2-SCL and B2-SDA, and the third I2C bus B3 includes B3-SCL and B3-SDA. Moreover, the command set on the command line L10 in LOW level thereof may select the first I2C bus B1 by the bus selector 20, while, the second bus B2 is selected in HIGH level.

As shown in FIG. 2, the third I2C bus B3 receives the clock and data for the NVR 12, and the clock and data for the DDM 14 in respective period different from others. In the I2C protocol, the transmission of the data starts at the falling edge of the data SDA during the clock SCL is HIGH as shown in evens, st1 to st3; while, the transmission completes at the leading of the data SDA during the clock SCL is HIGH, as shown in events, sp1 to sp3. Moreover, the data may be set during the clock SCL is LOW and thus set data on the line SDA may be transmitted at the leading edge of the clock SCL.

The DDM controller 16b set the command on the command line L10 in LOW at a period T1. Responding this command, the bus selector 20 may select the first I2C bus B1 at the period T1, and the NVR controller 16a may communicate with the NVR 12 via the I2C I/F 18 at the period T1.

In a subsequent period T2, the operation between the NVR controller 16a and the NVR 12 is interrupted to begin the operation between the DDM controller 16b and the DDM 14. The DDM controller 16b first sets the command on the command line L10 in HIGH, then, the bus selector 20 selects the second I2C bus B2 and holds the first I2C bus B1 in a status immediate before the selection. Thus, the operation between the NVR controller 16a and the NVR 12 is interrupted.

An embodiment shown in FIG. 2 selects the operation between the NVR controller 16a and the NVR 12 again at the end of the period T2 by setting the selection command on the command line L10 in LOW at a period T3 subsequent to the period T2. Then, the bus selector 20 selects the bus B1 and the DDM controller 16b resets the interruption for the NVR controller 16a to resume the operation between the NVR controller 16a and the NVR 12.

The embodiment shown in FIG. 2 recovers the operation between the DDM controller 16b and the DDM 14 at a period T4 subsequent to the period T3 by setting the command line L10 in HIGH and interrupt the NVR controller 16a. Further, the operation between the NVR controller 16a and the NVR 12 may be resumed at a period T5 subsequent to the period T4.

Thus, the optical transceiver 10 according to an embodiment thereof may set the priority of the operation of the controller 16 for the DMM 14, where the real time collection of inner status of the optical transceiver 10 is requested therein, by interrupting the operation for the NVR 12. The operation against the NVR 12 may be resumed securely after the completion of the operation for the DDM 14. Moreover, the optical transceiver 10 of the embodiment does not implement the dual controller each for the NVR 12 and the DDM 14 independently, which may suppress the expansion of the circuit size; only the bus selector 20 is added to carry the interruptive communication with the NVR 12 and the DDM 14.

The I2C protocol includes a slave address of the device connected with the controller 16 via the I2C bus and specific to the device. Duplicate slave addresses between devices connected to the same I2C bus may cause an erroneous operation in the I2C system. However, the NVR 12 and the DDM 14, or respective secondary I2C buses, B1 and B2, are isolated by the bus selector 20; the NVR 12 and the DDM 14 may have the same slave address.

Figure 3:
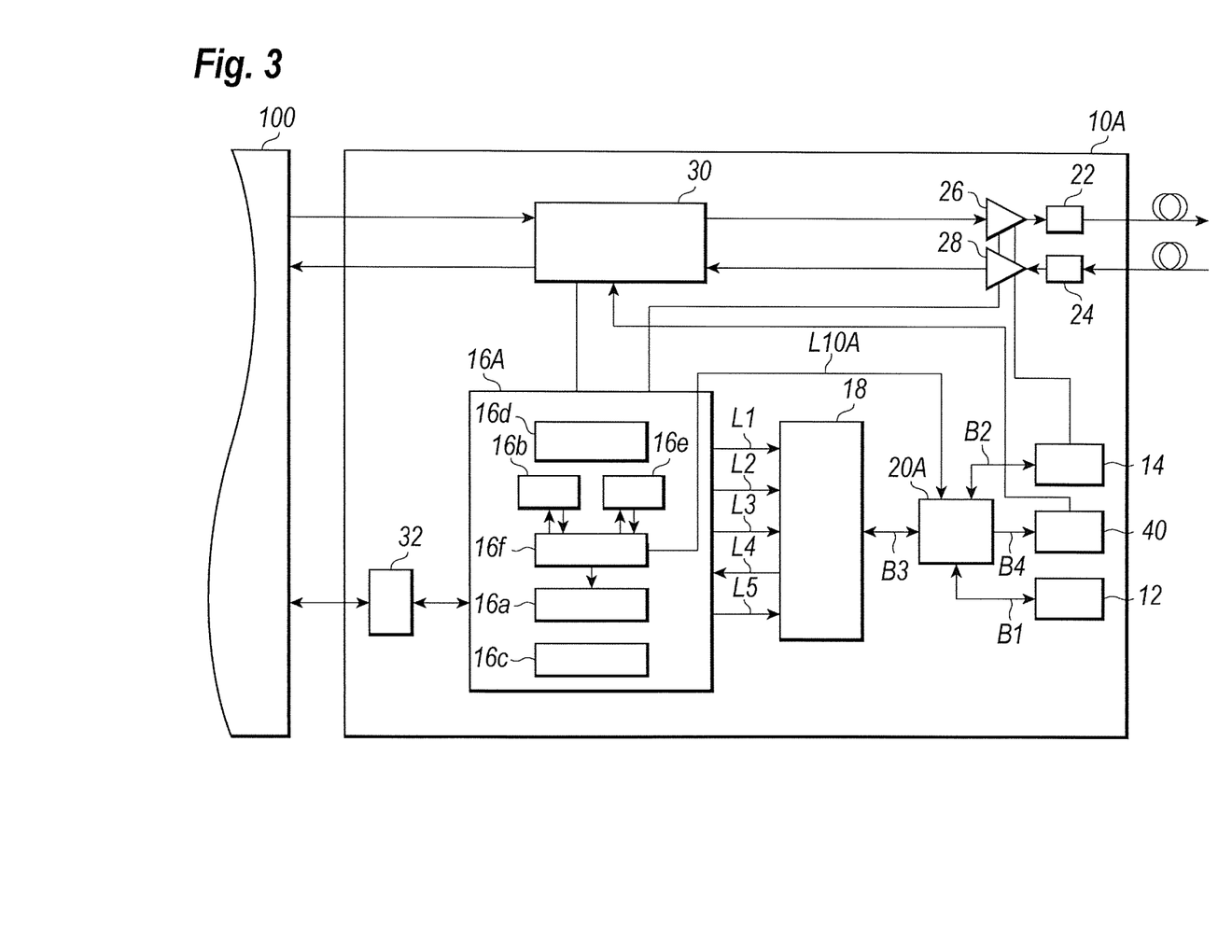
FIG. 3 shows a functional block diagram of an optical transceiver according to another embodiment of the invention.

Next, another embodiment according to the present invention will be described. FIG. 3 shows a functional block diagram of an optical transceiver of the other embodiment. The optical transceiver 10A includes, in addition to the NVR 12 and the DDM 14, a parallel port 40 as a device coupled with the I2C bus. The controller 16A also further includes a port controller 16e and a priority controller 16f. The bus selector 20 in the aforementioned embodiment is replaced to another bus selector 20A.

The parallel port 40 is connected to the bus selector 20A with an additional I2C bus B4; specifically, the parallel port 40 is coupled with the port controller 16e via the I2C I/F 18, the bus selector 20A and the additional I2C bus B4. The parallel port 40 may output signals received via the I2C bus B4. For instance, the parallel port 40, according to the instruction transferred from the host system 100, may send a command to the processing unit 30 to turn the power thereof on and off. That is, the port controller 16e may communicate with the parallel port 40, based on the command stored in the MDIO register 16c by the host system 100, to set this command on the parallel port 40 via the I2C I/F 18, the I2C bus B3, the bus selector 20A and the I2C bus B4.

The priority controller 16f may arbitrate the communications between the NVR controller 16a and the NVR 12, between the DDM controller 16b and the DDM 14, and between the port controller 16e and the parallel port 40. The DDM controller 16b in the optical transceiver 10A plays a role of the second controller, while, the priority controller 16f has a function of the third controller.

The priority controller 16f may set a command on the command line L10A to select one of the secondary I2C busses each connected to the NVR 12, the DDM 14, and the parallel port 40, respectively. Accordingly, the command line L10A of the present embodiment has two bits. Concurrent with the selecting of the bus selector 20A, the priority controller 16f interrupts the NVR controller 16a, the DDM controller 16b and the port controller 16e except for the one that begins the transmission with the device corresponding thereto.

That is, the priority controller 16f, when the NVR 12 is selected, sets the command on the command line L10A to select the bus B1 to communicate with the NVR 12, and interrupts the DDM controller 16b and the port controller 16e. In another condition when the transmission between the DDM controller 16b and the DDM 14 should be started during the NVR controller 16a communicate with the NVR 12, the priority controller 16f interrupts the NVR controller 16a and sets the command to select the second I2C bus B2 on the command line L10A. The bus selector 20A, may select the bus B2, while, holds status of bus B1 in the condition immediate before the selection of the second I2C bus B2.

Also, when the port controller 16e is necessary to be linked with the parallel port 40 when the NVR controller 16a communicates with the NVR 12, the priority controller 16f interrupts the NVR controller 16a to stop the communication and sets the command to select the bus B4 on the command line L10A; then, the bus selector 20A selects the fourth I2C bus B4 and holds the first I2C bus B1 in a state immediate before the change by ceasing serial clock SCL-B1 on the first I2C bus B1.

Thus, in a case that a communication having a priority higher than the current communication between the controller 16 and a device is necessary to be started, the current communication between the controller 16 and the device may be interrupted. Moreover, when the communication with the priority higher than the current communication is completed, the interrupted communication may be resumed. The priority of two communications, for instance, one of which is between the DDM controller 16b and the DDM 14, while, the other is between the port controller 16e and the parallel port 40, may be determined in advance to the practical implementation.

Figure 4:
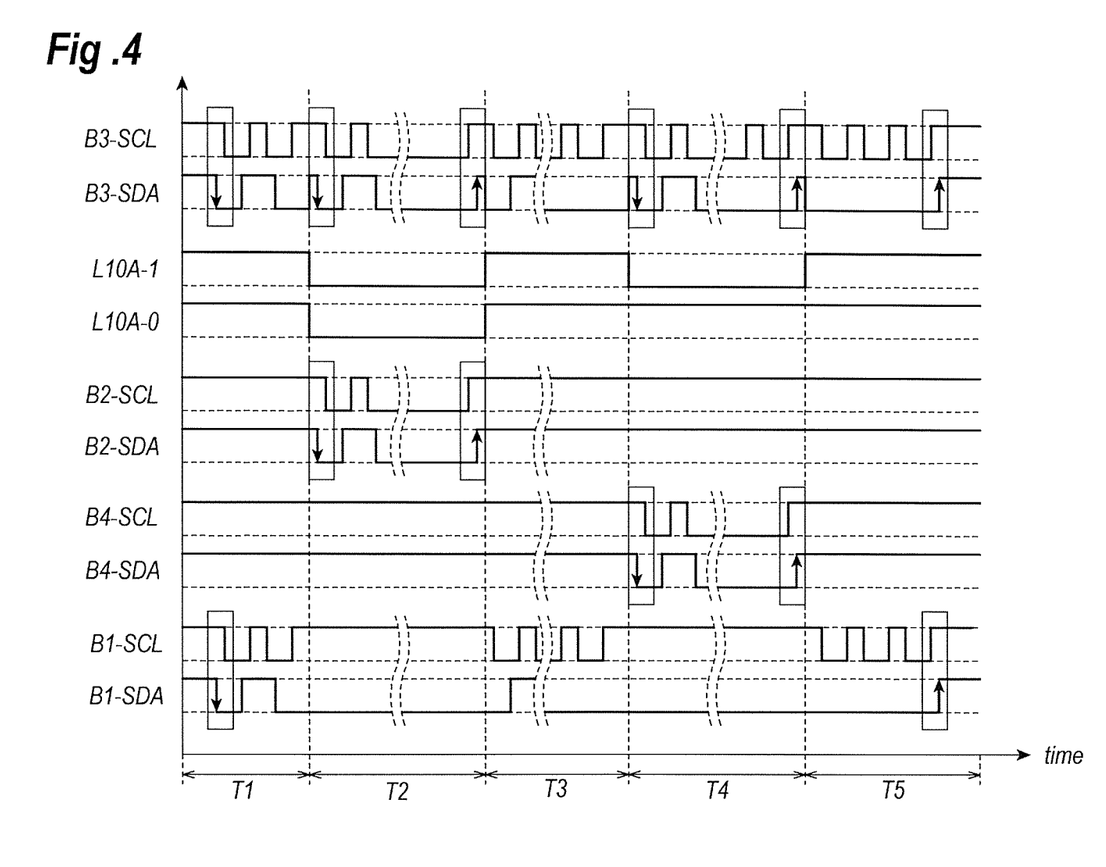
FIG. 4 shows time charts of I2C busses implemented with the optical transceiver shown in FIG. 3.

Protocols of the I2C buses, B1 to B4, and the command line L10A will be described as referring to FIG. 4, where the serial clock and the serial data of the bus B4, B4-SCL and B4-SDA, are shown comparable to signals appeared in the other busses, B1 to B3. FIG. 4 also shows the signal on the command line with two bits, L10A-1 and L10A-0.

In the example of FIG. 4, the NVR controller 16a occupies the I2C bus B1 at the first period T1 to communicate with the NVR 12. In this first period T1, the command line L10A is set in '11' to select the first I2C bus B1. In a subsequent period T2, the communication between the NVR controller 16a and the NVR 12 is interrupted to being the communication between the DDM controller 16b and the DDM 14 because the latter communication has the priority with respect to the former communication. In this period T2, the priority controller 16f sets the command on the command line L10A in '00' and interrupts the NVR controller 16a. Responding to the command on the command line L10A, the bus selector 20A may change the secondary bus from the first one B1 to the second one B2, which interrupts the transfer of signals on the first bus B1 and holds the status of the first bus E1 in a condition immediate before the change. Then, the communication between the DDM controller 16b and the DDM 14 begins via the I2C I/F 18.

This communication between the DDM controller 16b and the DDM 14 completes at the end of the second period T2, and the priority controller 16f sets the command on the line L10A, in '11' and releases the interruption set in the NVR controller 16a. The communication between the NVR controller 16a and the NVR 12 resumes in the third period T3.

At the period T4, the NVR controller 16a is interrupted to cease the communication with the NVR 12, and the port controller 16e may begin the communication with the parallel port 40 because the latter communication has a higher priority compared with the former communication with the NVR 12. The priority controller 16f interrupts the NVR controller 16a and sets the command line L10A in '01', where the first numeral '0' corresponds to the bit 1, while the last numeral '1' corresponds to the bit 0. Responding to the command on the line L10A, the bus selector 20A, changes the secondary bus from the first one B1 to the fourth one B4 and holds the status of the first bus B1. The communication between the NVR controller 16a and the NVR 12 is interrupted at the period T4, and the port controller 16e may begin the communication with the parallel port 40.

The communication between the port controller 16e and the parallel port 40 completes at the end of the period T4. Then, the priority controller 16f sets the command on the line L10A in '11' and releases the NVR controller 16a from the interrupted status. The bus selector 20A, responding to the command on the line L10A, selects the first I2C bus B1; thus, the communication between the NVR controller 16a and the NVR 12 may be resumed. The optical transceiver 10A may arbitrate the I2C inner bus B3 connected to respective peripheral devices depending on the command provided to the bus selector 20A from the controller 16.

Figure 5:
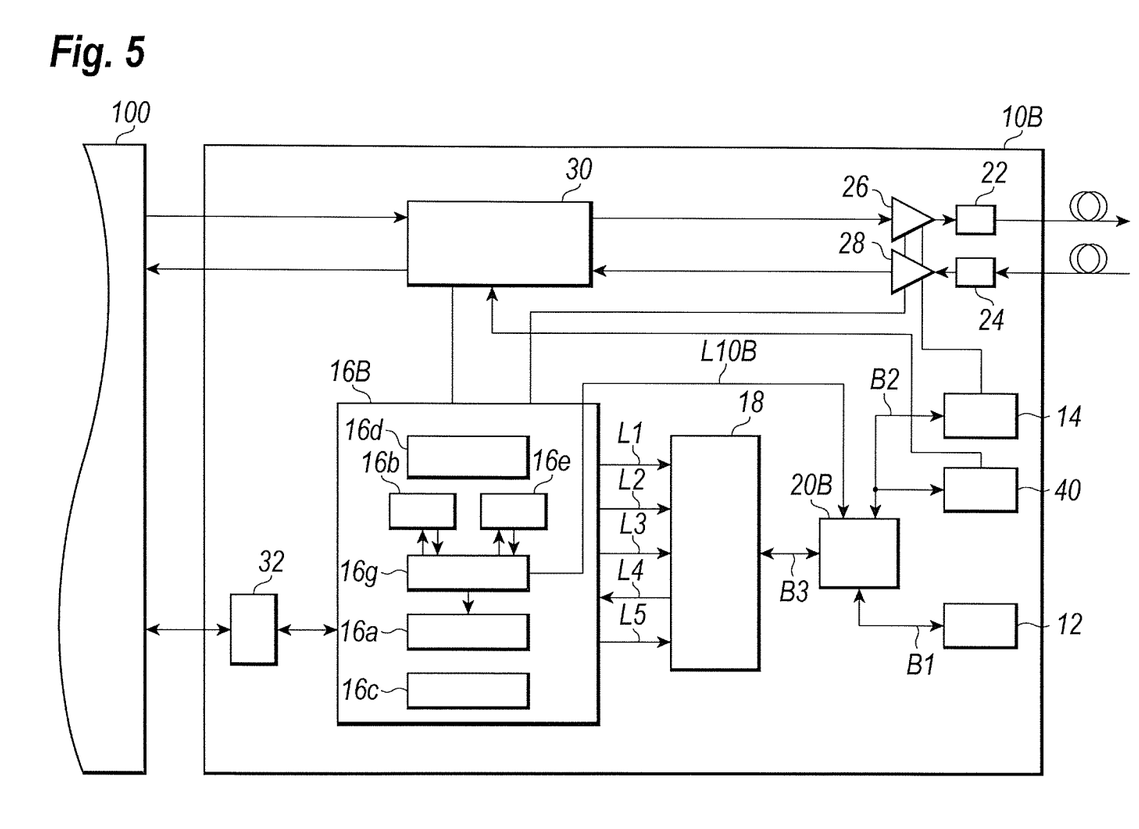
FIG. 5 shows a functional block diagram of an optical transceiver according to still another embodiment of the invention.

Next, still another embodiment of the optical transceiver according to the invention will be described. FIG. 5 shows a functional block diagram of an optical transceiver 10B according to another embodiment of the invention. The optical transceiver 10B has a parallel port 40 connected to the bus selector 20B but via the I2C bus common to the DMM 14. The controller 16B includes, instead of the port controller 16f of the aforementioned embodiment, only a priority controller 16g.

The priority controller 16g has an arrangement different from that of the aforementioned embodiment 16f in a point that the present priority controller 16g sets the command with one (1) bit on the command line L10B. In an example, the priority controller 16g may set the command in LOW on the command line L10B to select the first I2C bus B1 to communicate the NVR controller 16a with the NVR 12. The bus selector 20B may select, responding to this command on the command line L10B, the first I2C bus B1.

The priority controller 16g may also set the command in HIGH on the command line L10B when the communication between the DDM controller 16b and the DDM 14, or between the port controller 16e with the parallel port 40 should be started. The bus selector 20B, responding to this command on the command line L10B selects the second I2C bus B2 and holds the first I2C bus B1 in a state immediate before the interruption.

The DDM 14 and the parallel port 40 in FIG. 5 each have a specific slave address allocated thereto and different from others. The controller 16B may distinguish two devices by setting the slave address specific to the device in head of the transmission packets of the I2C standard. Moreover, the NVR 12 may have a slave address same to one of the salve address of the DDM 14 or the parallel port 40 because the latter two devices, 14 and 40, may be distinguished by the I2C bus.

Thus, the optical transceiver of the present invention has been described with reference to specific exemplary embodiments thereof. However, it will be apparent that further various modifications and changes may be made thereto without departing from the broader spirit and scope of the present invention. For example, the parallel port additionally implemented as a device controlled by the controller via the I2C bus is merely an instance; other devices with a priority higher than the NVR may be applicable in the optical transceiver. Another NVR with an access time faster than the NVR 12 is an example of such a device. In addition, the specification above describes control units, 16a to 16c, and 16e to 16g, as respective functional blocks. However, the controller, 16 to 16B, may implement those functions as respective program units. Also, the controller 16 to 10B may integrate the I2C interface 18 therein. Accordingly, the present specification and figures are to be regarded as illustrative rather than restrictive.

I claim:

1. An optical transceiver electrically controllable from a host system, comprising:
    a controller communicating with the host system;
    a first device and a second device each connected with the controller via a first inter-integrated circuit (I2C) busses and the second device being connected with the controller via a second I2C bus, the first device having a priority higher than a priority of the second device; and
    a bus selector, responding to a command provided from the controller when the second device I2C bus is selected, for selecting the first I2C bus and holding the second I2C bus in a state immediate before the selection of the first I2C bus.

2. The optical transceiver of claim 1,
    wherein the controller resumes the selection of the second I2C bus from the state when the selection of the first device completes.

3. The optical transceiver of claim 1,
    wherein the first device is a volatile memory to store inner status of the optical transceiver.

4. The optical transceiver of claim 1,
    wherein the second device is a nonvolatile memory to store semi-permanent data.

5. The optical transceiver of claim 1,
    wherein the first device is assigned with a same slave address thereof as a slave address of the second device.

6. The optical transceiver of claim 1,
further including a third device with a priority lower than the priority of the first device but higher than the priority of the second device,
wherein the bus selector, responding to the command provided from the controller when the first device is selected, selects the third device and holds the second I2C bus in a state immediate before the selection.

7. The optical transceiver of claim 6,
wherein the third device is connected with the controller via a third I2C bus different from the first and second I2C busses,
wherein the bus selector selects the third I2C bus and holds the second I2C bus by responding to the command when the second I2C bus is selected.

8. The optical transceiver of claim 6,
wherein the third device is assigned with a slave address thereof different from a slave address of the first device.

9. The optical transceiver of claim 8,
wherein the first to third devices are assigned with a same slave address thereof to each others.

10. The optical transceiver of claim 6,
wherein the third device is connected with the controller via the first I2C bus common to the first device,
wherein the bus selector selects the first I2C bus and holds the second I2C bus by responding to the command when the second I2C bus is selected, and
wherein the controller distinguishes the third device from the first device by an I2C packet carried on the first I2C bus.

11. The optical transceiver of claim 10,
wherein the first device is allocated in a slave address different from a slave address of the third device.

12. The optical transceiver of claim 11,
wherein the first device is allocated in a same slave address thereof as a slave address of the second device.

13. The optical transceiver of claim 11,
wherein the third device is allocated in a same slave address thereof as a slave address of the second device.

14. The optical transceiver of claim 1,
wherein the controller is connected with the host device via a management data input/output (MDIO) bus, and provides an MDIO register thereinto store commands sent from the host device and data read from devices temporarily.

\* \* \* \* \*